(12) United States Patent
Chaudhuri et al.

(10) Patent No.: US 7,194,451 B2
(45) Date of Patent: Mar. 20, 2007

(54) DATABASE MONITORING SYSTEM

(75) Inventors: Surajit Chaudhuri, Redmond, WA (US); Arnd Christian Konig, Redmond, WA (US); Vivek Narasayya, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 10/788,077

(22) Filed: Feb. 26, 2004

(65) Prior Publication Data

US 2005/0192921 A1 Sep. 1, 2005

(51) Int. Cl.
*G06F 17/30* (2006.01)
(52) U.S. Cl. .......................................... 707/2
(58) Field of Classification Search .................... 707/1, 707/2, 9, 10, 200; 709/224; 700/1
See application file for complete search history.

(56) References Cited

U.S. PATENT DOCUMENTS

| | | | |
|---|---|---|---|
| 5,819,288 A * | 10/1998 | De Bonet | 707/2 |
| 2003/0028631 A1* | 2/2003 | Rhodes | 709/224 |
| 2005/0125371 A1* | 6/2005 | Bhide et al. | 707/1 |

OTHER PUBLICATIONS

U. Dayal et al, The HiPAC project: combining active databases and timing constraints, 1988, ACM SIGMOD Record, vol. 17, Issue 1, (Mar. 1988) pp. 51-70.*

Carney D., Cetintemel U., Chemiack M., Convey C., Lee S., Seidman G., Stonebraker M., Tatbul N., Zdonik S. Monitoring Streams—A new class of Data Management Application., Proceedings of the VLDB 2002.
C. Forgy. RETE: A fast algorithm for the many patterns/many objects problem. Artificial Intelligence. 19(1): 17-37, 1982.
Chaudhuri S., Narasayya V. An Efficient, Cost-driven Index Selection Tool for Microsoft SQL Server. Proc. of VLDB 1997.
Dobra A., Garofalakis M., Gehrke J., Rastogi R. Processing Complex Aggregate Queries over Data Streams. Proc. of SIGMOD 2002.
"The HiPAC Project: Combining Active Databases and Timing Constraints" by U. Dayal, B. Blaustein, A. Buchman, U. Chakravarthy, M. Hsu, R. Ledin, D. McVarthy, A. Rosenthal, S. Sarin, M.J. Carey, M. Livny and R. Jauhari published in SIGMOD Record, vol. 17, No. 1, Mar. 1988.

(Continued)

*Primary Examiner*—Etienne P. LeRoux
(74) *Attorney, Agent, or Firm*—Microsoft Corporation

(57) ABSTRACT

A framework is provided within a database system for specifying database monitoring rules that will be evaluated as part of the execution code path of database events being monitored. The occurrence of a selected database event triggers a rule that evaluates some parameter of an object related to the event against a condition in the rule. If the condition is met, a specified action is taken that can alter the execution of the database event or database system performance. Lightweight aggregation tables are utilized to enable aggregation of object parameter values so that presently occurring events can be compared to a summary of the object parameter values from previously occurring database events. Signatures are assigned to queries based on the structure of the query plan so that information in the lightweight aggregation tables can be grouped according to query signature.

33 Claims, 7 Drawing Sheets

OTHER PUBLICATIONS

IBM DB2 Universal Database: System Monitor Guide and Reference. ftp://ftp.software.ibm.com/ps/products/db2/info/vr8/pdf/letter/db2f0e80.pdf.

Goldstein J., Larson P. Optimizing Queries Using Materialized Views: A Practical, Scalable Solution. Proc. of SIGMOD 2001.

Lohman G., Lightstone S. SMART: Making DB2 (More) Autonomic. Proc. of VLDB 2002.

Madden S., Shah M., Hellerstein J., Raman V. Continuously Adaptive Continuous Queries over Streams. Proc. of SIGMOD 2002.

D.P. Miranker. TREAT: A Better Match Algorithm for AI Production Systems. Proceedings of the National Conference on AI, 42-47, Aug. 1987.

Praveen Seshadri: Building Notification Services with Microsoft SQLServer—abstract, and SQL Server Notification Services—presentation. SIGMOD Conference 2003.

Weikum G., Moenkeberg A., Hasse C., Zabback P. Self-tuning Database Technology and Information Services: from Wishful Thinking to Viable Engineering. Proc. of VLDB 2002.

* cited by examiner

| ATTRIBUTE NAME | TYPE | COMMENT |
|---|---|---|
| Query ID | Integer | |
| Query Text | Stringer | |
| Log. Plan Signature | Integer | |
| Phys. Plan Signature | Integer | |
| Log. Transaction Signature | Integer | Refer to the context the query is called in |
| Log. Transaction Signature | Integer | |
| Start_Time | | |
| Duration | Float | |
| Estimated_Cost | Float | |
| Time_Blocked | Float | |
| Times_Blocked | Integer | |
| Queries_Blocked | Integer | # of queries currently blocked |
| SPID | Integer | |
| Number_of_instances | Integer | |
| Query Type | atomic | Type $\in$ {UPDATE, SELECT, INSERT, DELETE} |

Fig.4

DATABASE MONITORING SYSTEM

TECHNICAL FIELD

The invention relates generally to the field of database system administration and more particularly to a system for continuously monitoring performance of a database system.

BACKGROUND OF THE INVENTION

The ability to monitor a database server is an important aspect of database administration. Monitoring is desirable in a variety of scenarios such as detecting performance problems, bottlenecks, or abnormal conditions as well as auditing usage of system resources and tracking trends for capacity planning. In most of these scenarios, monitoring should be accompanied by an ability to take some action such as correcting a performance problem or generating a report of system usage. The need for automated monitoring becomes greater as databases are used by more complex applications with advanced configurations. Some automated monitoring systems can reduce total cost of ownership and increase efficiency of a database manager (DBA).

Today's commercial database systems have support for gathering counters about system usage such as CPU usage, number of active connections, currently executing queries, locks held by currently executing threads, etc. These counters are exposed to clients using two basic mechanisms: polling and event recording. Polling allows a snapshot of these counters at various points in time by polling the server. Event recording enables counters associated with a system event to be written into a file or table. Events of interest include SQL statement execution begin and end, lock acquire and release, and user login and logout. With each event several counters associated with the event may be recorded such as: time, database identification, an application that causes the event, and/or duration of the event. While these mechanisms are commonly available in conventional systems, they have drawbacks. If polling is performed infrequently, then the monitoring application can lose valuable information. On the other hand if polling is performed very frequently it can impose significant CPU overheads on the server. Similarly, event recording (although not lossy), can incur significant overhead on the server since a potentially large number of events needs to be written out to the file or table or sent over the network. The following examples of common monitoring tasks illustrate these drawbacks.

A common task for DBAs is to detect "outlier" invocations of a stored procedure (P) that are much slower to execute than other instances of (P). This is useful since the DBA can later analyze these outliers to determine reasons for underperforming. Similarly another common task is to detect total delay due to blocking caused by update statements issued by applications over a measured interval of time. This task can be helpful in detecting locking problems due to poor application design or unanticipated interactions across applications. For both of these tasks, event recording would cause a very large volume of monitored data to be written out by the server including stored procedure completion events in the first example and blocking/release events in the second example. The large amount of data is written even though the amount of data that the DBA needs to review is considerably smaller. If the example tasks are performed using a polling approach, the answers obtained by infrequent polling may be compromised if outlier occurrences are missed. On the other hand, very frequent polling incurs significant load on the server due to repeated traversal of a lock resource dependency graph to detect total delay due to blocking.

Typical commercial database systems have support for event logging as well as for obtaining a snapshot of system counters by polling the server. IBM DB2 Health Center is a tool that continuously monitors "health" of the database system and alerts DBA by email or pager or by logging the problem. An alert is raised when the value of the counter being monitored crosses a threshold. There are several third party monitoring tools for today's commercial database systems with similar functionality. These systems are client side applications that are added to the database server by the client. Some database systems feature inbuilt support for triggers in database systems or provide general purpose notification services. These mechanisms provide limited monitoring features and flexibility while incurring substantial overhead on the database system. Also, because these systems often obtain information about database events after the events have occurred, these systems have only limited ability to alter database functioning as monitored events are occurring.

SUMMARY OF THE INVENTION

Evaluating database monitoring rules within the execution code path of database events enables real-time control of database performance. According to one embodiment of the present invention, the execution code for database events that are selected to be enabled for monitoring is configured to branch to a rule engine during execution that evaluates the conditions in monitoring rules. The rule engine evaluates any rule that is triggered by a given database event against a condition in the rule. The rule engine takes a rule-specified action when the condition is met.

To facilitate rule evaluation during event execution, aggregation tables are used to store aggregate information for a collection of monitored query objects having an attribute value in common. In addition, reporting tables that are aggregation tables materialized on a stable storage medium can be used to manage an amount of memory used by the aggregation tables and to provide output to a DBA. According to one feature of the invention, an aggregation table maintenance module maintains the memory size of the aggregation table to less than a threshold amount.

Attribute probes are used to collect information about an attribute. The rule engine accesses a probe corresponding to an object attribute referenced in a condition to evaluate the condition. A signature probe is a type of probe that identifies a logical or physical structure of a query plan for a query object and computes a query signature for the query based on the logical structure of the query plan. Thus, the aggregation tables can advantageously be grouped or aggregated by query signature.

BRIEF SUMMARY OF THE DRAWINGS

FIG. 4 is a table representation of a database monitoring schema in accordance with one embodiment of the present invention;

DETAILED DESCRIPTION OF THE INVENTION

Database Monitoring System Overview

Figure 1:
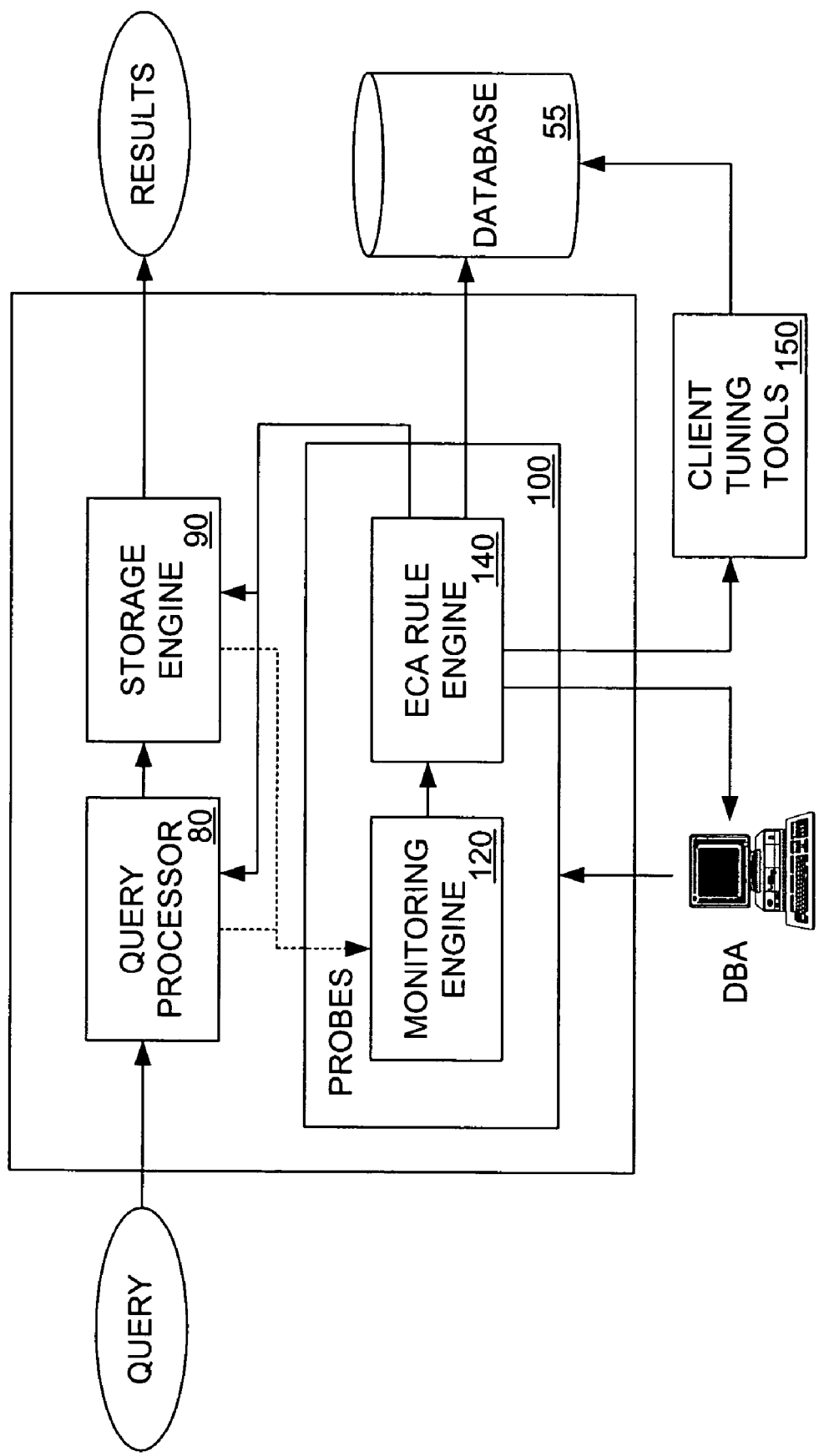
FIG. 1 is functional block diagram of a database monitoring system constructed in accordance with an embodiment of the present invention.

Referring to FIG. 1, a continuous database monitoring system 100 is depicted that exposes a flexible programming module to enable a user to specify a variety of monitoring tasks, including the ability to take actions based on monitored data. The evaluation of database events takes place in the execution code path of the database events. The monitoring system has many features that enable this 'real time' evaluation of database events. In addition, the monitoring and reaction functions are implemented with relatively little increase in overhead costs. The continuous database monitoring system 100 includes a monitoring engine 120 that is implemented in close association with the database server resulting in numerous advantages over polling and logging techniques discussed in the background section.

Several monitoring tasks require the ability to observe a large number of events in the server. However, the actions to be taken as a consequence of monitoring these tasks are often based on a much smaller volume of information that is typically filtered and/or aggregated. As an example, the task of finding a top k most expensive queries during a week requires an ability to observe an execution time of queries that execute on the server but to report only the k most expensive queries. Likewise, reporting instances of a stored procedure that take much longer to execute than an average instance typically requires an ability to monitor instances of the stored procedure; however only the outliers need be reported. Because the monitoring engine 120 is implemented in close association with the database server, the observed events can be filtered and/or aggregated as part of the query execution path, allowing for a much quicker analysis of system performance. In addition, since the monitoring takes place in the execution code path of the observed events, actions can be taken in response to the monitored information that affect the real-time operation of the processing of queries.

Since the monitoring system 100 provides the ability to filter and aggregate the monitored data within the server environment, the volume of information that needs to be exposed from the server to the client is typically small. Thus, the overhead for passing monitored data out of the server can be kept small. As discussed in the background, current database monitoring systems either require pushing out all the data (incurring high overhead) or pulling the required data by polling the server (incurring high overhead or sacrificing accuracy).

A rule engine 140 uses a lightweight Event-Condition-Action (ECA) framework as the interface for specifying monitoring rules. Since the rule engine is implemented in the server and rules are evaluated in the execution code path of events, efficiency is a concern. Due to their simplicity, ECA rules are amenable to implementation with low CPU and memory overheads. ECA rules also allow specification of options that control the memory overhead of monitoring. Moreover, the CPU overhead of monitoring events is limited to whatever is necessary to evaluate the currently specified rules.

The user (typically a DBA) interacts with the monitoring system 100 by specifying ECA rules for implementing monitoring tasks. These rules are expressed against a schema that defines valid events, conditions, and actions supported by the monitoring system. The basis of the schema is a set of monitored object types and their attributes, which are abstractions for entities in the database system that can be monitored. An example of the portion of the schema dealing with the query object type is shown in FIG. 4. The query type is an abstraction for a query that is executed by the server. The Query type has a fixed set of attributes such as Duration (actual time taken to execute the query) or Estimated_Cost (time estimated by the optimizer to execute the query). The other attributes for the Query object are listed in the table in FIG. 4. A logical plan signature and the other signature attributes are discussed in more detail below. Attributes are referred to in this context as probes since their values are populated by probing (or extracting from) the database server. Support of an attribute or probe in the schema can require instrumentation of server code to be able to extract necessary information (e.g. inserting a timer around query execution code to measure Duration, or extracting the estimated execution time from the execution plan generated by the query optimizer). In general, the decision of exactly what object types and attributes should be exposed in the schema will be determined by the expected usage.

The Query type object is one of five server objects that are monitored in a simple version of the monitoring system 100. A Transaction object has identical attributes to the query object, except for the plan signatures, which are exposed as a list of integers, and transaction signatures, which are a list of query signatures called in the transaction. Blocker and Blocked objects represent combinations of queries where the Blocker query owns a lock on a resource incompatible with the lock and the Blocked query is waiting on the same resource. A Timer object is provided to facilitate periodic invocation of rules that cannot be tied to a specific event. The system exposes a set number of Timer objects. These timers can be set to a specific wait period, after which they create a Timer.Alarm event. A Timer object is also provided that exposes the current time as an attribute. It will be appreciated that these server object types are but a small subset of the server object types that would be useful in implementing a database monitoring system in accordance with the present invention.

Monitoring Engine

Referring again to FIG. 1, to facilitate the monitoring and implementation of corrective action within a database event execution code path, the monitoring engine 120 collects objects and attributes necessary to implement currently active rules. Objects are grouped, and aggregates are computed for each group, and the resulting data is stored in in-memory data structures called lightweight aggregation tables (LATs). Grouping in LATs is performed on attributes of the object type. For example, in one LAT queries can be grouped by the application (or user) that issued them. In addition, for certain object types, the monitoring system provides a library of special attributes called signatures, which can also be helpful for grouping objects of that type. Intuitively, a signature is an encoding of the object, such as a hash value, that is computed by the monitoring engine 120. For example, one kind of signature for a Query type object is such that all queries that are identical except in their parameter values (i.e., constants) are assigned the same signature value. Such a signature can be useful for grouping all instance of the same query template for performance comparisons. For many tasks such as reporting the average and standard deviation of the Duration attribute of all queries in a signature group, only an aggregate value of one or more attributes in a group is necessary. Aggregation functions such as COUNT and AVERAGE can be specified on any attribute in this manner.

The various attributes of the exposed objects are gathered through probes inside the relevant execution paths. The monitoring engine 120 collects the attributes of the monitored objects through use of probes inside the query processor and storage engine, which are assembled into objects on demand at the time of rule evaluation. As most of the probes are available at various points of the server code already, this typically adds negligible overhead to query execution.

In most cases the use of probes adds negligible overhead to the execution time, as most of the exposed statistics are recorded inside the server already. The only exception to this is the computation of pairs of a blocking and blocked query. This requires traversal on the lock-resource graph; if the rule that references these objects is triggered by a related event (such as Query.Blocked), the code triggering rule evaluation is simply piggybacked on a regular lock-conflict detection code.

Rule Engine

Figure 5:
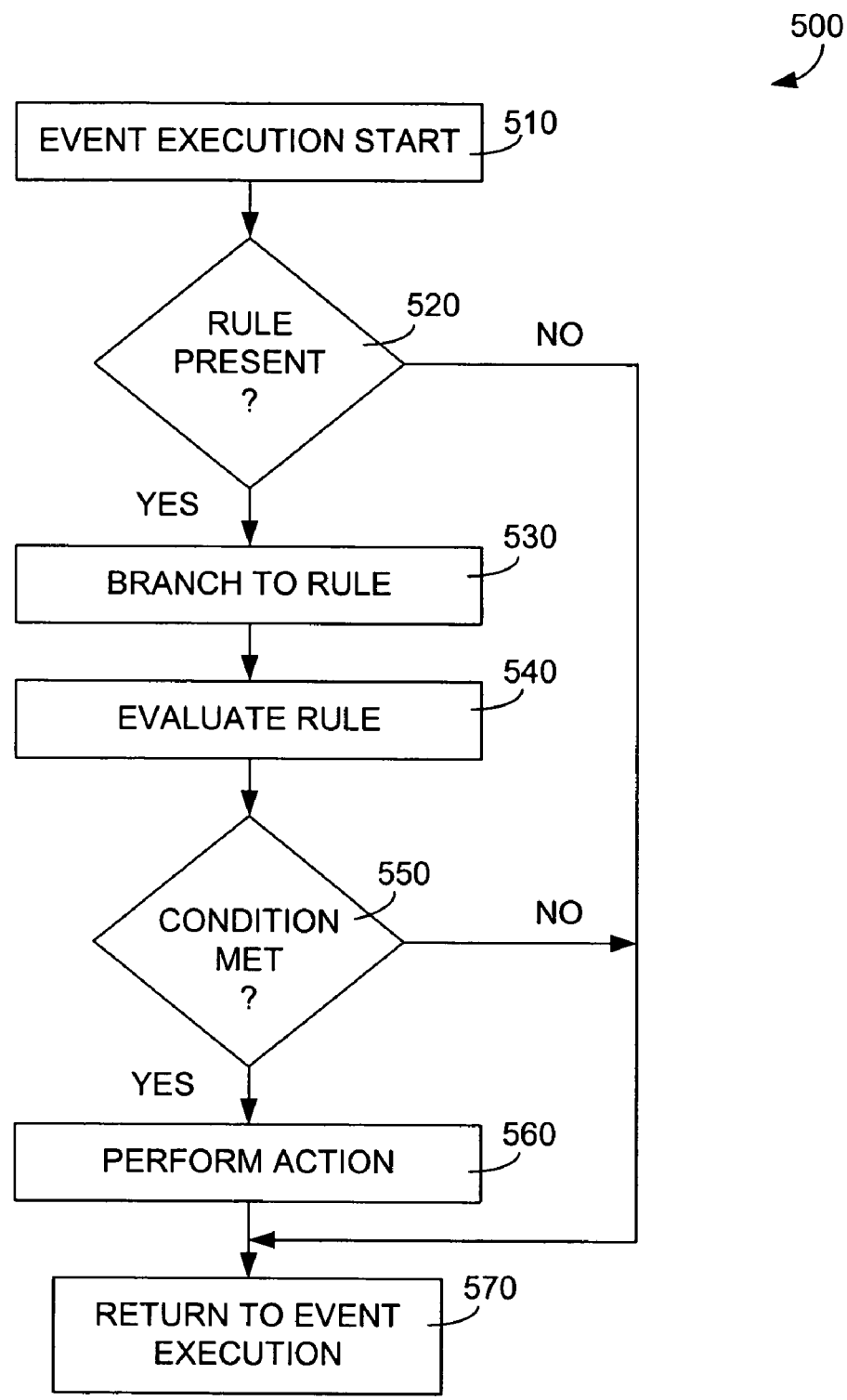
FIG. 5 is a flowchart depicting an overview of a method of operation for a rule engine constructed according to one embodiment of the present invention.

The rule engine monitors events and takes the necessary action when the condition in a rule becomes true, known as the rule "firing". The evaluation of rules is written into the execution code path for database events that are selected to be enabled for monitoring. An overview of a method that is performed by the rule engine is presented in FIG. 5. When execution of a database event occurs at 510, the status of rules in the rule engine is checked to determine if a rule is active that is triggered by the event at 520. If a rule is present, the execution code of the database event branches at 550 so that the rule is evaluated at 540 and responsive action is taken at 560 before execution of the database event proceeds at 570.

For example, the following rule appends to a specified table T any query (when it commits) that takes more than 100 seconds to execute:

Event: Query.Commit
Condition: Query.Duration>100
Action: Query.Report(T)

Actions such as writing an entry to a table, sending an email, or launching a specified program in response to an event can be useful for a variety of monitoring tasks.

In order to provide efficient rule evaluation during the execution code path of database events, the database monitoring system 100 includes three features: LATs, query signatures, and a lightweight ECA rule engine.

Lightweight Aggregation Tables (LATs)

Several monitoring tasks require the ability to filter on dynamically maintained aggregate values of probes (as opposed to constant thresholds, which are typically supported in currently available client-side monitoring applications). Thus, it is advantageous to keep some state of the collected probes, which can be referenced inside the conditions of ECA rules. This ability is important for any monitoring application that seeks to detect outliers, changes in workload, or any other condition that correlate the present and past performance.

The ability to keep state or history information about probes is provided through LATs, which offer a mechanism for storing aggregate information over collections of monitored objects. A LAT is defined through (a) a set of grouping attributes and (b) a set of aggregation functions, both of them defined over the attributes of the monitored object stored in the LAT. Which monitored objects are inserted into the LAT is governed by the rules in the rule engine. The semantics correspond to projection and aggregation operators applied to the inserted objects: the objects are grouped on the grouping attributes, and the aggregation functions evaluated over each group (as in a traditional GROUP BY query). In addition to the standard aggregation functions COUNT, SUM, and AVG, the described monitoring system also supports STDEV (standard deviation) and FIRST and LAST, which retain the value assigned to the attribute by the first or last object inserted into the container, respectively. The latter type of aggregation is important when using the LAT to store a representation of a workload (which can be used later for index tuning, thus requiring the query text to be stored) that does not use the query text attribute as a grouping column. For certain combinations of objects, which conceptually have a foreign-key relation, it is also possible to define an aggregation table storing combinations of these objects of different type, for example, the combination of the Blocked and Blocker objects.

Figure 2:
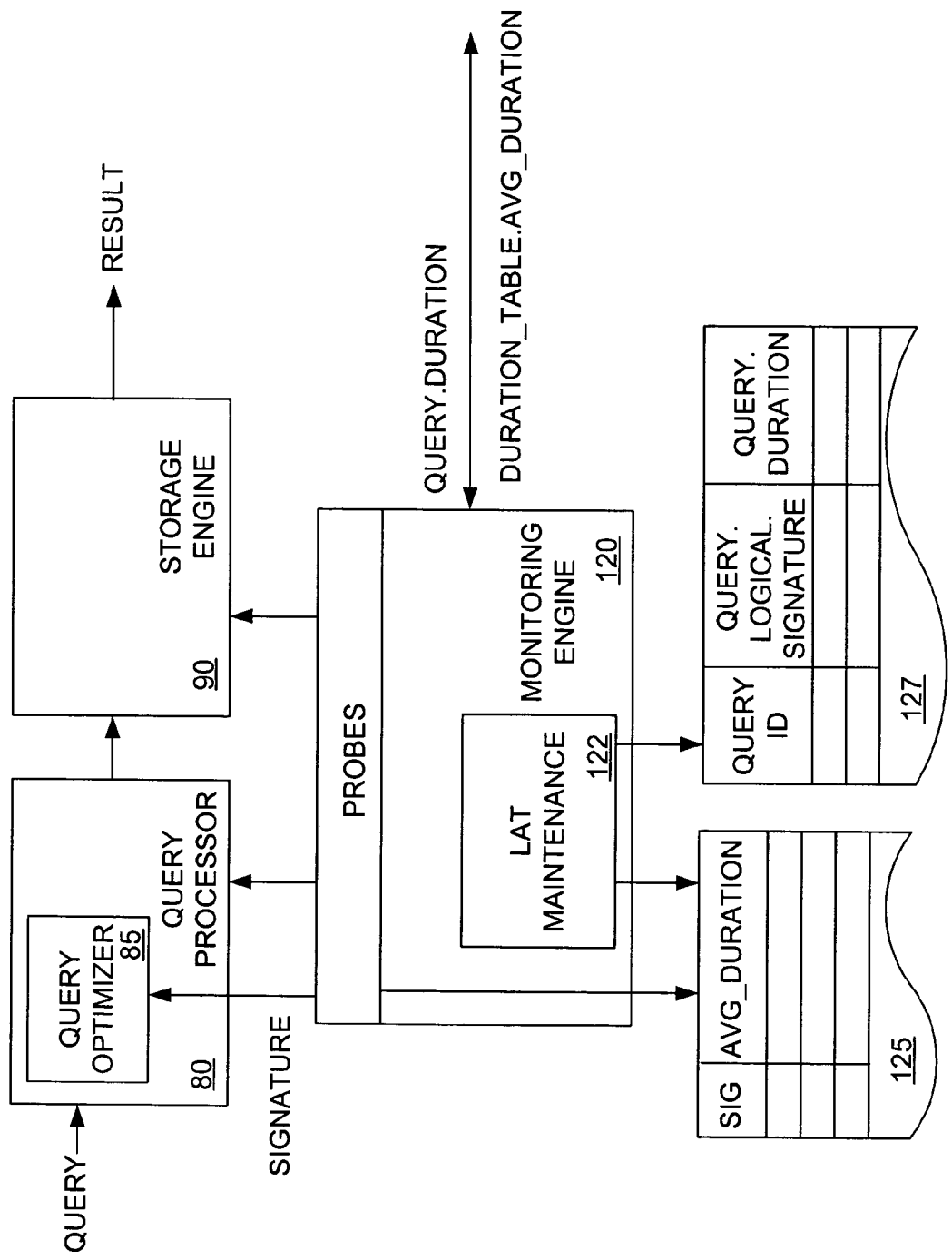
FIG. 2 is a functional block diagram of the monitoring engine illustrated in FIG. 1.

LAT tables are specified in a manner similar to the specification of other database tables. In FIG. 2 two LATs are shown, a LAT that stores an average duration for queries having the same signature is labeled 125 and a LAT that serves as a reporting table 127 for query instances that are "much slower" than average for use in tracking average duration of a query for use with a typical monitoring task described below in Example 1.

Aggregation tables are in-memory objects at the server, but it is possible to persist them through the use of reporting tables. To accomplish this, an aggregation table is associated with a disk-resident table with schema identical to the aggregation table, plus one additional column labeled ReportID. Through the use of rules, it is possible to write portions of the contents of the aggregation table to the associated table—this is referred to as report generation. Each report is given a unique id stored in the associated table. In addition, for each report the id of the rule that triggered the report and the time the report was generated is stored, indexed by the ReportID in the system table Reports. The use of reporting tables enables the more complex operations that the rule engine does not support to be performed on the data that is collected in the reporting tables. Furthermore, it is possible to maintain LAT data over multiple restarts of the database server by uploading the contents of a reporting table to a specific LAT at database startup.

Figure 6:
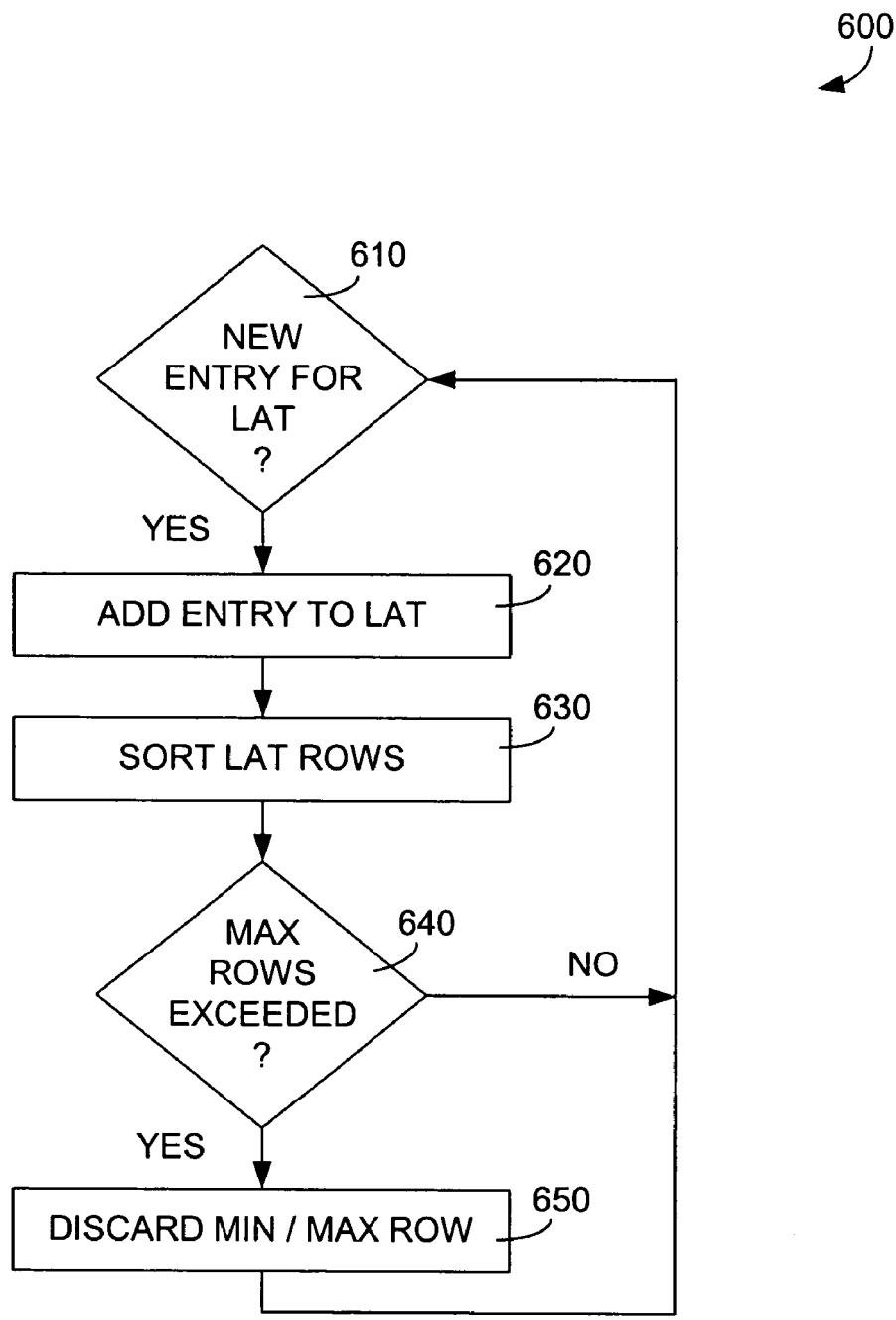
FIG. 6 is a flowchart depicting a method for maintaining an aggregation table according to an embodiment of the present invention.

Because aggregation tables are memory-resident, they compete for memory with operator workspace memory and cache space. Therefore limits on maximum size (in terms of number of rows stored) can be specified for an aggregation table, together with a rule specifying which of a number of actions to take if this limit is exceeded: In the described embodiment, LAT maintenance is performed by the LAT maintenance module 122 in the monitoring engine and shown functionally in FIG. 2. FIG. 6 outlines a method 600 for maintaining the size of a LAT to below a specified maximum number. When a new entry is generated for the LAT at 610, a row corresponding to the entry is added to the LAT at 620. At 630, the LAT is sorted according to an order defined in the LAT's specification. If the number of rows in the LAT exceeds the specified maximum number of rows (640) a minimum or maximum row (depending on the sort convention) is discarded at 650. Other actions that could be taken at 650 when the table exceed the size limit include: (a) writing the min/max row based on a sort order specified on a subset of the aggregation columns to either a different aggregation table or a reporting table and delete it, or (b) writing out the entire contents of the LAT to a reporting table, and then erasing the contents of the LAT. The size-limitation is specified by the DBA or application creating the LAT through the use of a MAXSIZE clause in the table definition, which is specified together with an ORDER BY clause declaring a subset of the columns and the keyword ASCENDING/DESCENDING indicating in which order to evict rows from the table. Exceeding the size limit of a LAT creates a Table. Overflow event which can in turn fire a rule that implements the eviction policy.

For LATs that are not referenced in the condition part of an active rule (and thus don't require instantaneous access), the ability to write aggregation tables to a reporting table can further be used to reduce the memory footprint of the LATs. For example, for an aggregation table that collects the query text and duration of the k most expensive queries for a day (which are collected to be tuned later by the DBA), the LAT can quickly consume a significant amount of memory. When the server needs to reclaim memory, it can temporarily reduce the size of the LAT by writing the additional queries to a temporary reporting table. Because the rule for eviction is known at the server (the least expensive queries are dropped), the server can maintain the correct eviction semantics at all times. Once the server has spare memory, the aggregation table can then grow in size. Since the union of the in-memory LAT and the reporting table can contain more than k queries, the correct top k most expensive queries can be retrieved by aggregating over both the LAT and the temporary reporting table. This approach is still more efficient than writing all queries to the reporting table immediately and delaying all aggregation, because the smaller LAT can support significant filtering.

Query Signatures

Many database applications execute "templatized" queries repeatedly, such as instances of the same query with different constants in the selection conditions. In this case, it is natural for the DBA to track the performance of the template, rather than each individual query. A stored procedure can be structured as follows: IF Condition THEN A ELSE B, where A and B are actions taken by the database system. Some instances of the stored procedure will execute A, while others will execute B. The performance of the stored procedure could be different in each case. It is helpful for the DBA to monitor performance of these two different paths separately.

The simplest method for generating a query signature is to match the query-text. This approach can be sufficient to differentiate different parameter-less stored procedure, but any purely query-text based grouping is undesirable due to its sensitivity to formatting and its inability to identify different instances of the same query with different parameters. To support monitoring tasks such as the ones describe above, the monitoring system employs query signatures. A query signature is an integer value that is exposed as an attribute for the Query object. If two queries have the same signature, they share the same internal structure (depending on the exact signature type used); otherwise their structure differs. It bears noting again that LATs can be grouped on signatures. In FIG. 2, a signature probe is shown function-ally as monitoring the query plan that is generated by the query optimizer 85 to detect the query's structure.

Four kinds of signatures that can be useful include (1) logical query signatures, (2) physical plan signatures, (3) logical transaction signatures, and (4) physical transaction signatures. Logical query signatures are useful to monitor execution of recurring query templates which have a number of implicit parameter values that vary from one instance to another. To facilitate such grouping, the monitoring system uses an internal logical query tree generated during query optimization to compute a linearized representation for the structure of a query. Two queries are assigned the same logical signature value if their internal representations are identical. In addition, if the query is executed as part of a stored procedure with the parameters $P_1, \ldots P_n$, all occurrences of a parameter $P_i$ is replaced with the symbol $P_i$ and in addition every constant appearing in an atomic condition is replaced with a wildcard symbol. The logical query signature is computed during query optimization and then persisted with the query plan; thus if a query plan is cached, so is its signature, thereby keeping the overhead for signature computation low.

The physical plan signature is computed similarly to the logical one, with the linearized representation being constructed over the physical operators in the query's execution plan. The physical plan signature is necessary to differentiate the different execution plans for a given logical signature, which is important when one query template can result in execution plans with very different behavior. The physical plan signature has applications in plan management and in tuning recompile statements.

The logical transaction signature is defined through the sequence of logical query signature inside a transaction. A logical transaction signature can distinguish between the different code paths in a transaction with branching constructs. This is important when monitoring query execution on the level of transactions or stored procedures, when the execution behavior of different paths varies significantly. The physical transaction signature is defined analogously to the logical one, except over the sequence of physical plan signatures.

Lightweight ECA Structure

The rule engine 140 evaluates Event-Condition-Action rules as part of the execution code path. Rules are specified as an event E, a condition C and an action A. The action A is executed whenever the event E occurs and C is evaluated as being true. In order to keep the overhead of the monitoring system low, the expressiveness of the rule language is limited to a relatively small set of common operations required by most monitoring applications.

The monitoring system's rule engine supports a number of different events to be used in the E-clause of an ECA-rule. Events are used to indicate when a condition is to be evaluated. The execution code path of each monitoring-enabled event is modified to branch to the monitoring code as part of the execution of the event. Events that can be monitored include transition points in the execution of a query such as the query committing or aborting, or interruption of the execution such as an operator being blocked. The Query type object has a number of events associated with it that indicate various transition points in query execution, among them Query.Commit, Query.Start, Query.Compile, Query.Cancel, Query.Rollback, Query.Blocked, and Query.Block_Released. In cases where the condition evaluation cannot be tied to a system event (for example to detect queries that are blocked for more than a given threshold), the Timer object can be used to instrument a background thread that periodically evaluates such rules. It should be noted that a wide variety of events, including events related to connection management, database maintenance or operating system events can be used in the database monitoring system.

The rule engine evaluates conditions defined over the object attributes defined in the schema, the logical operators {=, !=, <, >, <=, >=} and the mathematical operators {+, −, *, /}. The order of evaluation can be specified using brackets and multiple conditions can be combined using the logical AND or OR operators.

In cases where the monitored object in the condition occurs in the Event clause, the scope of the rule is the object triggering the event. When the event clause doesn't reference an object in the condition (e.g., timer based events), the scope of the rule is over all objects of the type referenced in the condition clause. For example, if the event clause does not reference a Query object and the condition clause is: Query.Time_Blocked>55, then the engine iterates over all query objects currently in the system. Note that if the rule references more than one object type in the condition clause, the rule engine iterates over combinations for the objects of the given types currently existing on the system.

In addition to monitored objects attributes, it is possible to refer in rules to columns of LAT objects such as Tablename.Columnname. All references to LAT rows are implicitly ∃-quantified so that if a matching row doesn't exist the condition is evaluated to be false.

A basic implementation of the monitoring system supports two general categories of actions: actions that are attached to monitored objects (which are specified as Object.Action(Parameters)) and actions that do not require an object. The action clause of the ECA rule can consist of a sequence of different actions. A few of the many types of actions that can be supported by the rule engine are summarized below.

Report(Tablename) writes the monitored object to a permanent table or LAT of compatible schema. This action can be applied to any of the monitored objects (in which case all the attributes associated with the object, that occur as column-names in the table are written), a single row in a LAT object, or an entire LAT, in which case all rows in the LAT are written. SendMail("Text",address) generates a mail message with the given text as message body to be sent to the given mail address. Attribute values from system objects and LATs can be substituted into the text string. Cancel( ) can be applied to a Query, Blocker or Blocked object and cancels the query. Delay(event, condition) can be applied to a query object that hasn't started execution yet (meaning the event is Query.Start). This action delays the execution of the query until the event occurs and the condition evaluates to be true. RunExternal("Command") launches an external application. Attribute values and LAT values can be substituted into the command string.

Overview Example—Detecting Outlier Instances of a Stored Procedure

The following example will be used as a context in which to summarize the operation of main components of the monitoring system 100. The task of detecting invocations of a stored procedure P that are outlier, or invocations that are much slower to execute than other instances, is an important and common task for DBAs. "Much slower" is defined for the purpose of this example as taking more than five times the average amount of time taken by other instances of procedure P. This type of outlier detection is often valuable for DBAs to identify problematic combinations of parameters for the stored procedure. In this example, any "much slower" instance of P is to be stored in a reporting table named Query.Report. The following rule (shown also in the rule engine 140 in FIG. 3) can be used to implement this task:

Event: Query.Commit
Condition:
    Query.Duration>5*Duration_Table.Avg_Duration
Action Query.Report FIGS. 3 and 4 are functional block diagrams that depict the operations performed by the monitoring engine 120 (FIG. 2) and the ECA rule engine 140 (FIG. 3) to accomplish this database management task.

FIG. 2 illustrates functionally tasks performed by the monitoring engine to perform the database management task outlined above. The monitoring engine 120 maintains a set of probes that collect information about database object attributes such as query duration and query logical plan signature. When requested by the rule engine (see FIG. 3), the monitoring engine provides information about the query duration from a probe as well as the aggregate information for the average duration for queries having the same signature. The aggregate information is readily available from LAT 125 which stores an average duration value for each query signature.

Figure 3:
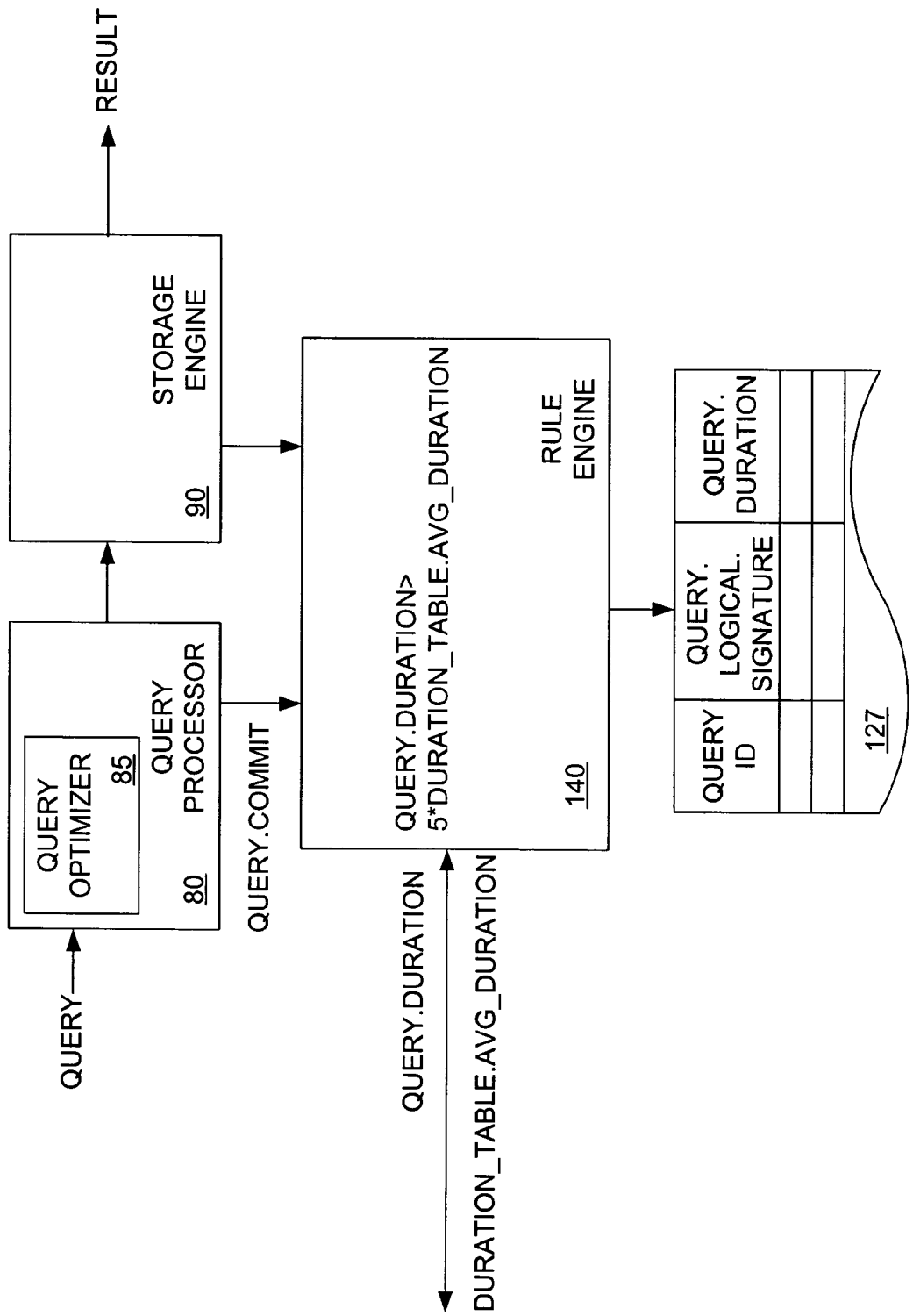
FIG. 3 is a functional block diagram of the ECA rule engine illustrated in FIG. 1.

Referring to FIG. 3, the rule engine 140 detects the occurrence of specified database events such as query start, query end, and query cancellation that are occurring during operation of the query processor 80 and storage engine 90. When the database event Query.Commit is detected, the rule is triggered. The rule engine 140 receives information from the monitoring engine, specifically the duration of the query that is presently executing and information about the average duration of queries having the same query logical plan signature. The rule engine evaluates the information that is retrieved from the monitoring engine against the condition and if the condition is met, takes the specified action, namely Query.Report which is recording the query identification, query logical plan signature, and query duration to a reporting table 127 that is maintained by the monitoring engine.

The following additional examples illustrate the benefits of providing a database monitoring system within the database server. A common problem faced by DBAs is detecting which update statements are responsible for the largest blocking delays in the system. For each statement, the total time for which it blocked other statements needs to be tracked. Such a task can help in identifying poor design in the database application such as a hot spot in the data or metadata. This task is specified in the monitoring system as a simple ECA rule triggered by any state S releasing a lock resource other statements are waiting one. For each of the blocked statements, the time it has been waiting on the lock resource is the added to the total waiting time for S.

A typical methodology used by DBAs for identifying performance bottlenecks is to find the few most expensive queries over a measured period of time. Even for this simple task, the overheads of using today's monitoring solutions can be high. In contrast, this task can be easily specified in the described monitoring system and the overheads are relatively low. A LAT that stores queries and their cost is constructed and two rules would be specified in the lightweight ECA rule framework: 1) an insertion rule that inserts every query after it commits into the LAT and 2) a rule that discards (when more than K queries are inserted in the LAT) the query with the least cost.

DBAs often desire to audit or summarize usage of system resources. This is necessary to enforce service level agreements, detect potentially unauthorized access attempts and to summarize query/update templates for a particular application, their associated frequencies and average/max duration for each template. This task is greatly aided by the described monitoring system which provides the ability to assign signatures to queries to enable grouping and reporting based on queries resulting from a given template.

A flexible monitoring resource way can be useful in a variety of scenarios. A runaway query that has exceeded a certain budget on system resources can be stopped. A limit on concurrent query execution for a user can be enforced. The multi-programming level can be adjusted dynamically based on the monitored resource consumption. For example, the system can allow two or more queries to execute simultaneously only if their combined memory requirements can be satisfied. The memory requirements of a query could be estimated based on monitored data (e.g., average/max memory consumed by the query (or query signature) in the past).

The ability to specify at which level of granularity or grouping to store monitored information at the server is important, as different tasks may call for monitoring at the level of connections, applications, users, or transactions. Any interface with a fixed schema is likely to either not provide a sufficiently fine level of aggregation or to be too detailed, thereby requiring too much memory inside the database server for state. The use of LATs provides a form of flexible, in server aggregation.

Exemplary Operating Environment

The database system 55 described above includes a database monitoring system 100 constructed in accordance with one exemplary embodiment of the invention. Most typically, the database system 55 and the monitoring system 100 are constructed in software executing on a computer system 20 (FIG. 7) such as a server computer which in turn is coupled to other servers or computers on a network. A computer system 20 that can serve as a server or database computer is depicted in FIG. 7 and described in greater detail below.

Figure 7:
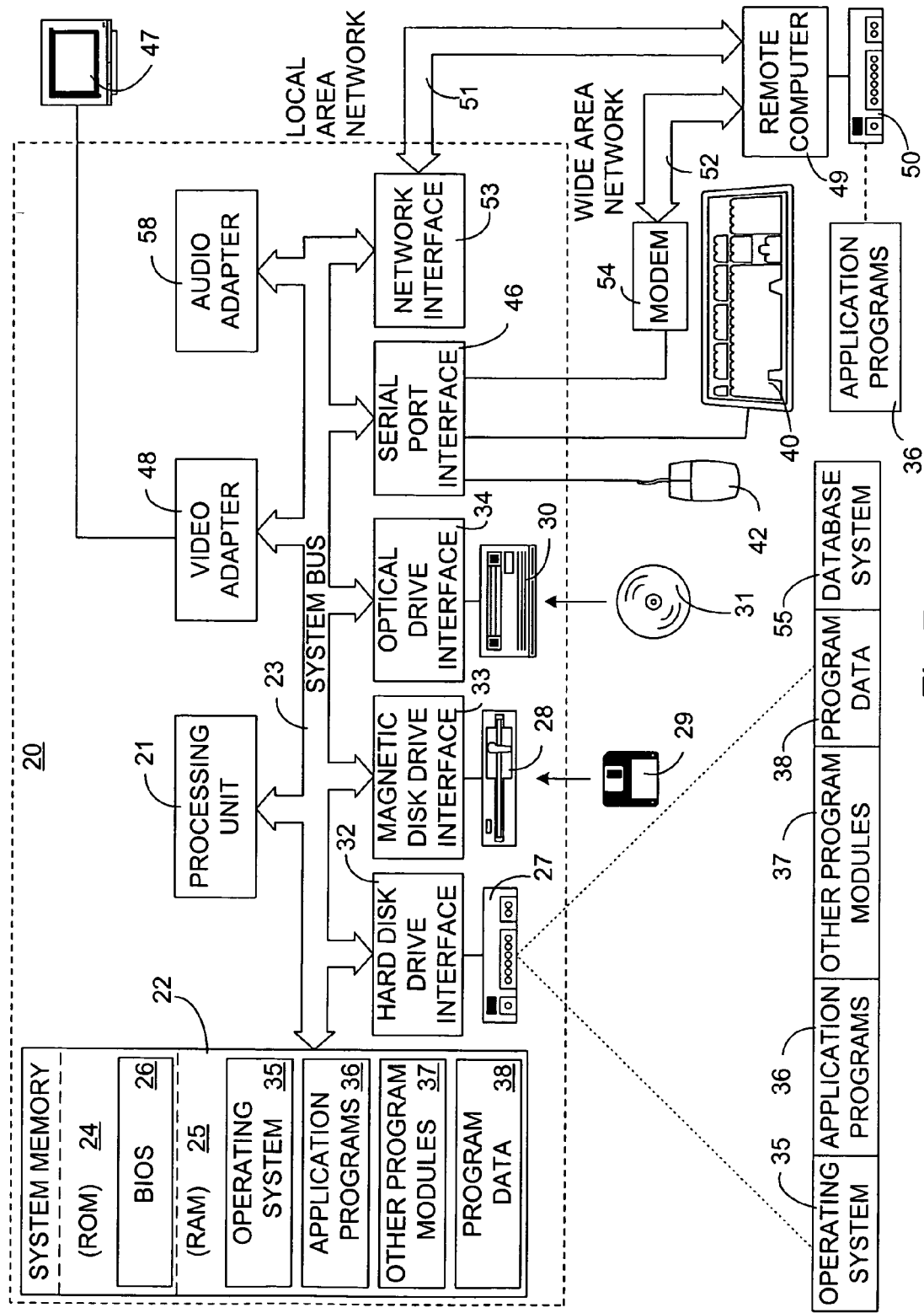
FIG. 7 illustrates an exemplary operating environment for a database monitoring system of the present invention.

FIG. 7 and the following discussion are intended to provide a brief, general description of a suitable computing environment in which the invention can be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 7, an exemplary system for implementing the invention includes a general purpose computing device in the form of a conventional personal computer 20, including a processing unit 21, a system memory 22, and a system bus 23 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disc drive 30 for reading from or writing to a removable optical disc 31 such as a CD ROM or other optical media. Hard disk drive 27, magnetic disk drive 28, and optical disc drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disc 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disc 31, ROM 24 or RAM 25, including an operating system 35, one or more application programs 36, other program modules 37, and program data 38. A database system 55 may also be stored on the hard disk, magnetic disk 29, optical disc 31, ROM 24 or RAM 25. A user may enter commands and information into personal computer 20 through input devices such as a keyboard 40 and pointing device 42. Other input devices may include a microphone, stylus, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 7. The logical connections depicted in FIG. 7 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over a wide area network 52, such as the Internet. Modem 54, which may be internal or external, is connected to system bus 23 via serial port interface 46 or a broadband connection. In a networked environment, program modules depicted relative to personal computer 20, or portions thereof, may be stored in remote memory storage device 50. It will be appreciated that the network connections shown are exemplary and other means of establishing a communications link between the computers may be used.

It can be seen from the foregoing description that providing a database monitoring system that can evaluate conditions on database events as part of the event execution code path enables real-time corrective action to be taken in response to the monitored performance. Although the present invention has been described with a degree of particularity, it is the intent that the invention include all modifications and alterations from the disclosed design falling within the spirit or scope of the appended claims.

We claim:

1. A database monitoring system that monitors performance of a database system in which database events having an execution code path are occurring, comprising:
 a collection of database system object types each having at least one object attribute that corresponds to a property of the object type;
 a rule engine that evaluates rules for taking action based on database system performance;
 wherein a rule is triggered by occurrence of a database event and specifies a condition and an action to be taken by the monitoring system when the condition is met; and
 wherein the rule engine evaluates the condition as part of the database event's execution code path and takes the specified action if the condition is met.

2. The system of claim 1 further comprising a collection of attribute probes that collect information about object attributes and wherein the rule engine accesses a probe corresponding to an object attribute referenced in a condition to evaluate the condition.

3. The system of claim 2 wherein the collection of probes includes a signature probe that identifies a logical structure of a query plan for a query object and computes a query signature for the query based on the logical structure of the query plan.

4. The system of claim 2 wherein the collection of probes includes a signature probe that identifies a physical structure of a query plan for a query object and computes a query signature for the query based on the physical structure of the query plan.

5. The system of claim 1 further comprising at least one aggregation table object that stores in column-value attributes aggregate information for a collection of monitored query objects having an object attribute value in common.

6. The system of claim 5 further comprising a reporting table that is an aggregation table materialized on a stable storage medium.

7. The system of claim 5 further comprising an aggregation table maintenance module that maintains the memory size of the aggregation table to less than a threshold amount.

8. The system of claim 2 further comprising at least one aggregation table object that stores in column-value attributes aggregate information over a collection of monitored query objects and wherein the collection of probes includes a signature probe that identifies a logical structure of a query plan for a query object and computes a query signature for the query based on the logical structure of the query plan and wherein entries in the aggregation table are aggregated by query signature.

9. The system of claim 2 further comprising at least one aggregation table object that stores in column-value attributes aggregate information over a collection of monitored query objects and wherein the collection of probes includes a signature probe that identifies a physical structure of a query plan for a query object and computes a query signature for the query based on the physical structure of the query plan and wherein entries in the aggregation table are aggregated by query signature.

10. The system of claim 5 wherein the object attribute is an aggregate of object attribute values stored in the aggregation table.

11. A method that initiates a response action when a database event meets a specified condition, comprising:
 inserting a branch instruction within the execution code path of the database event that branches to a set of rules, wherein a rule specifies the condition and the response action to be taken when the condition is true; and
 triggering the specified action when the database event meets the specified condition.

12. The method of claim 11 comprising storing aggregated information pertaining to the condition from previous occurrences of the database event in an aggregation table.

13. The method of claim 12 wherein the aggregation table stores an aggregated value of a parameter associated with an object related to the database event over all occurrences of the database event.

14. The method of claim 13 comprising limiting a memory size of the aggregation table to n entries by sorting entries in the aggregation table based on the value of the parameter and discarding an n+1 ranked entry.

15. The method of claim 11 comprising identifying a query structure for a query object executed on the database and assigning a query signature to the query object based on the identified structure.

16. The method of claim 15 comprising storing aggregated information pertaining to the condition from previous occurrences of database events having the same query signature in an aggregation table.

17. One or more computer readable media comprising computer-executable instructions for performing the method of claim 11.

18. One or more computer readable media comprising computer executable instructions for monitoring performance of a database system in which database events having an execution code path are occurring, the instructions comprising:
 defining a collection of database system object types each having at least one object attribute that corresponds to a property of the object type as part of the database event's execution code path,
 evaluating rules for taking action based on database system performance;
 wherein a rule is triggered by the database event's execution code path and specifies a condition on at least one object attribute and an action to be taken by the monitoring system when the condition is met; and
 taking the specified action if the condition is met.

19. The computer readable medium of claim 18 wherein the instructions further comprise defining attribute probes that collect information about an object attribute and accessing a probe corresponding to an object attribute in the condition to evaluate the condition.

20. The computer readable medium of claim 19 wherein the instructions further comprise defining a signature probe that identifies a logical structure of a query plan for a query object and computing a query signature for the query based on the logical structure of the query plan.

21. The computer readable medium of claim 19 wherein the instructions comprise defining a signature probe that identifies a physical structure of a query plan for a query object and computing a query signature for the query based on the physical structure of the query plan.

22. The computer readable medium of claim 19 wherein the instructions further comprise constructing at least one aggregation table that stores aggregate information for a collection of monitored query objects having an object attribute value in common.

23. The computer readable medium of claim 22 wherein the instructions further comprise constructing a reporting table by materializing a an aggregation table on a stable storage medium.

24. The computer readable medium of claim 22 wherein the instructions further comprise maintaining the memory size of the aggregation table to less than a threshold amount.

25. The computer readable medium of claim 20 wherein the instructions further comprise constructing at least one aggregation table that stores aggregate information over a collection of monitored query events, defining a signature probe that identifies a logical structure of a query plan for a query object, computing a query signature for the query object based on the logical structure of the query event's plan, and aggregating entries in the aggregation table by query signature.

26. The computer readable medium of claim 20 wherein the instructions further comprise constructing at least one aggregation table that stores aggregate information over a collection of monitored query objects, defining a signature probe that identifies a physical structure of a query plan for a query object, computing a query signature for the query object based on the physical structure of the query event's plan, and aggregating entries in the aggregation table by query signature.

27. The computer readable medium of claim 22 wherein the instructions further comprise aggregating object attribute values and evaluating the condition based on an aggregated object attribute value stored in the aggregation table.

28. A An apparatus that initiates a response action when a database event meets a specified condition, comprising:
  means for inserting a database monitoring rule within the execution code path of the database event that specifies the condition and the response action to be taken when the specified condition is true; and
  means for triggering the specified response action when the database event meets the specified condition.

29. The apparatus of claim 28 comprising means for storing aggregated information pertaining to the condition from previous occurrences of the database event in an aggregation table.

30. The apparatus of claim 29 wherein the means for storing aggregated information stores an aggregated value of a parameter associated with an object related to the database event over all occurrences of the database event in the aggregation table.

31. The apparatus of claim 30 comprising means for limiting a memory size of the aggregation table to n entries by that includes means for sorting entries in the aggregation table based on the value of the parameter and means for discarding an n+1 ranked entry.

32. The apparatus of claim 31 comprising means for identifying a query structure for each query object executed on the database and means for assigning a query signature to each query object executed on the database based on the identified structure.

33. The apparatus of claim 32 comprising means for storing aggregated information pertaining to the condition from previous occurrences of query objects having the same query signature in an aggregation table.

* * * * *